(12) United States Patent
Beausoleil et al.

(10) Patent No.: US 7,043,417 B1
(45) Date of Patent: May 9, 2006

(54) HIGH SPEED SOFTWARE DRIVEN EMULATOR COMPRISED OF A PLURALITY OF EMULATION PROCESSORS WITH IMPROVED MULTIPLEXED DATA MEMORY

(75) Inventors: William F. Beausoleil, Hopewell Junction, NY (US); R. Bryan Cook, Poughkeepsie, NY (US); Tak-kwong Ng, Hyde Park, NY (US); Helmut Roth, Hopewell Junction, NY (US); Peter Tannenbaum, Woodstock, NY (US); Lawrence A. Thomas, West Hurley, NY (US); Norton J. Tomassetti, Kingston, NY (US)

(73) Assignee: Quickturn Design Systems, Inc., San Jose, CA (US)

( * ) Notice: Subject to any disclaimer, the term of this patent is extended or adjusted under 35 U.S.C. 154(b) by 1004 days.

(21) Appl. No.: 09/656,146

(22) Filed: Sep. 6, 2000

(51) Int. Cl.
  *G06F 9/455* (2006.01)
  *G06F 13/00* (2006.01)
(52) U.S. Cl. .................... 703/26; 711/151; 370/220
(58) Field of Classification Search ............ 703/23, 703/26; 711/151; 370/220; 710/48
See application file for complete search history.

(56) References Cited

U.S. PATENT DOCUMENTS 4,914,612 A     4/1990   Beece et al. ............... 364/578
5,444,860 A *   8/1995   Datwyler et al. .......... 710/52
5,551,013 A     8/1996   Beausoleil et al. ........ 395/500
5,708,850 A *   1/1998   Staros ..................... 710/48
5,822,564 A    10/1998   Chilton et al. ............ 395/500
5,920,712 A     7/1999   Kuijsten ................. 395/500
5,923,865 A     7/1999   Chilton et al. ............ 395/500
5,963,736 A    10/1999   Sarno et al. ............ 395/500.48
6,026,230 A *   2/2000   Lin et al. .................. 703/13
6,035,117 A     3/2000   Beausoleil et al. ...... 395/500.46
6,051,030 A     4/2000   Beausoleil et al. ......... 703/28
6,473,838 B1* 10/2002   Bass et al. ................ 711/151
6,523,155 B1    2/2003   Ruedinger ................. 716/7
6,618,698 B1    9/2003   Beausoleil et al. ........ 703/23

FOREIGN PATENT DOCUMENTS

EP         504515 A2 *   9/1992

* cited by examiner

*Primary Examiner*—Paul L. Rodrigueg
*Assistant Examiner*—Dwin M. Craig
(74) *Attorney, Agent, or Firm*—Orrick Herrington & Sutcliffe LLP

(57) ABSTRACT

In an emulator processor cluster, the read ports of a shared input and data memory stack are time multiplexed to serve more than one processor. In an exemplary embodiment of the invention, a 256×8 memory array serves as the shared memory for four processors in a cluster. Two read ports are time multiplexed among the four processors in the cluster. On one read cycle, data from the two read ports is coupled to two processors. The next read cycle reads data from the same two ports to the remaining two processors. In the preferred embodiment, the memory operates at twice the system clock speed so that overall emulation process execution time is not effected.

11 Claims, 5 Drawing Sheets

| FIG. 1A | FIG. 1B |
| FIG. 1C | FIG. 1D |

HIGH SPEED SOFTWARE DRIVEN EMULATOR COMPRISED OF A PLURALITY OF EMULATION PROCESSORS WITH IMPROVED MULTIPLEXED DATA MEMORY

CROSS REFERENCE TO RELATED APPLICATIONS

The following copending applications, assigned to the assignee of the present invention, contain common disclosure and are incorporated herein by reference in their entireties:

"High Speed Software Driven Emulator Comprised of a Plurality of Emulation Processors with Improved Board-to-Board Interconnection Cable Length Identification System," Ser. No. 09/655,595, filed Sep. 6, 2000.

"High Speed Software Driven Emulator Comprised of a Plurality of Emulation Processors with an Improved Maintenance Bus that Streams Data at High Speed," Serial No. 09/656,147, filed Sep. 6, 2000.

"High Speed Software Driven Emulator Comprised of a Plurality of Emulation Processors with a Method to Allow High Speed Bulk Read/Write Operation Synchronous DRAM While Refreshing the Memory," Ser. No. 09/656,541, filed Sep. 6, 2000.

"High Speed Software Driven Emulator Comprised of a Plurality of Emulation Processors with a Method to Allow Memory Read/Writes Without Interrupting the Emulation," Ser. No. 09/656,596, filed Sep. 6, 2000.

FIELD OF THE INVENTION

This invention relates to a software driven emulator comprised of a large plurality of processors operating in parallel with each capable of performing a logic function under program control, and more particularly to a space efficient data and input memory stack shared by a cluster of processor.

Trademarks:

S/390 and IBM are registered trademarks of International Business Machines Corporation, Armonk, N.Y., U.S.A. and Lotus is a registered trademark of its subsidiary Lotus Development Corporation, an independent subsidiary of International Business Machines Corporation, Armonk, N.Y. Other names may be registered trademarks or product names of International Business Machines Corporation or other companies.

BACKGROUND

The usefulness of software driven emulators has increased enormously with growth in the complexity of integrated circuits. Basically, an emulation engine operates to mimic the logical design of a set of one or more integrated circuit chips. The emulation of these chips in terms of their logical design is highly desirable for several reasons. The utilization of emulation engines has also grown up with and around the corresponding utilization of design automation tools for the construction and design of integrated circuit chip devices. In particular, as part of the input for the design automation process, logic descriptions of the desired circuit chip functions are provided. The existence of such software tools for processing these descriptions in the design process is well suited to the utilization of emulation engines which are electrically configured to duplicate the same logic function that is provided by a design automation tool.

Utilization of emulation devices permits testing and verification via electrical circuits of logic designs before these designs are committed to a so-called "silicon foundry" for manufacture. The input to such foundries is the functional logic description required for the chip and its output is initially a set of photolithographic masks which are then used in the manufacture of the desired electrical circuit chip device. Verifying that logic designs are correct in the early stage of chip manufacturing eliminates the need for costly and time-consuming second passes through a silicon foundry.

Another advantage of emulation systems is that they provide a device that makes possible the early validation of software meant to operate the emulated chips. Thus, software can be designed, evaluated and tested well before the time when actual circuit chips become available. Additionally, emulation systems can also operate as simulator-accelerator devices thus providing a high-speed simulation platform.

Emulation engines of the type contemplated by this invention contain an interconnected array of emulation processors (EP). Each emulation processor (hereinafter, also sometimes simply referred to as "processor") can be programmed to evaluate logic function (for example, AND, OR XOR, NOT, NOR, NAND, etc.). The program driven processors operate together as an interconnected unit, emulate the entire desired logic design. However, as integrated circuit designs grow in size, more emulation processors are required to accomplish the emulation task. An aim, therefore, is to increase the capacity of emulation engines in order to meet the increasingly difficult task of emulating more and more complex circuits and logic functions by increasing the number of emulation processors in each of its modules.

For purposes of better understanding the structure and operation of emulation devices generally, and this invention particularly, U.S. Pat. Nos. 5,551,013 and 6,618,698 and assigned to the assignee of this application are hereby incorporated herein by reference.

U.S. Pat. No. 5,551,013 shows an emulation module having multiple (e.g. 64) processors. All processors within the module are identical. The sequencer and the interconnection network occur only once in a module. The control stores hold a program created by an emulation compiler for a specified processor. The stack memory, which is the subject of this invention, holds data and inputs previously generated and is addressed by fields in a corresponding control word to locate the bits for input to the processor logic element. During each step of the sequencer an emulation processor emulates a logic function according to the emulation program. The data flow control interprets the current control word to route and latch data within the processor. The node-bit-out signal from a specified processor is presented to the interconnection network where it is distributed to each of the muliplexors (one for each processor) of the module. The node address field in the control word allows a specified processor to select for its node-bit-in signal the node-bit-out signal from any of the processors within its module. The node bit is stored in the input stack on every step. During any operation the node-bit-out signal of a specified processor may be accessed by none, one, or all of the processors within the module.

Data routing within each processor's data flow and through the interconnection network occurs independently of and overlaps the execution of the logic emulation function in each processor. Each control store stores control words executed sequentially under control of the sequencer and program steps in the associated module. Each revolution of the sequencer causes the step value to advance from zero to a predetermined maximum value and corresponds to one target clock cycle for the emulated design. A control word in the control store is simultaneously selected during each step of the sequencer. A logic function operation is defined by each control word.

Each of these emulation processors has an execution unit for processing multiple types of logic gate functions. Each emulation processor switches from a specified one logic gate function to a next logic gate function in a switched-emulation sequence of different gate functions. The switched-emulation sequence of each of the processors thus can emulate a subset of gates in a hardware arrangement in which gates are of any type that the emulation processors functionality represents for a sequence of clock cycles. The processors are coupled by a like number of multiplexors having outputs respectively connected to the emulation processors of a module and having inputs respectively connected to each of the other emulation processors. The bus connected to the multiplexors enables an output from any emulation processor to be transferred to an input of any other of the emulation processors. In accordance with the teachings of the pending application, this basic design of the U.S. Pat. No. 5,551,013 patent is improved by interconnecting processors into clusters. With the processors interconnected in clusters, the evaluation phases can be cascaded, and all processors in a cluster perform the setup and storing of results in parallel. This setup includes routing of the data through multiple evaluation units for the evaluation phase. For most efficient operation, the input stack and data stack of each processor must be stored in shared memory within each cluster. Then, all processors perform the storage phase, again in parallel. The net result is multiple cascaded evaluations performed in a single emulation step. Every processor in a cluster can access the input and data stacks of every other processor in the cluster and the less space on each module chip for the functions that support the processor operation, particularly the memory functions. While the emulation processor described in U.S. Pat. No. 6,618,698 has obvious advantages, as more and more components are placed on a singe ET 4 chip, the availability of real estate on the chip becomes more and more a factor in the successful realization of an advanced emulation processor design.

SUMMARY OF THE INVENTION

An object of this invention is the provision of an emulation processor cluster input and data stack memory that makes more efficient use of the silicon real estate as compared with prior art emulation processor cluster designs.

Briefly, this invention contemplates the provision of an emulator processor cluster in which the read ports of a shared input and data memory stack are time multiplexed to serve more than one processor. In an exemplary embodiment of the invention, a 256×8 memory array serves as the shared memory for four processors in a cluster. Two read ports are time multiplexed among the four processors in the cluster. On one read cycle, data from the two read ports is coupled to two processors. The next read cycle reads data from the same two ports to the remaining two processors. In the preferred embodiment, the memory operates at twice the system clock speed so that overall emulation process execution time is not effected.

BRIEF DESCRIPTION OF THE DRAWINGS

The foregoing and other features and advantages of the invention will be described with reference to the accompanying drawings. In the drawings, like reference numbers generally indicate identical, functionally similar, and/or structurally similar elements. Also in the figures, the left most digit of each reference number corresponds to the figure in which the reference number is first used.

FIGS. 1A–E are a block diagram of a four processor cluster of the type more fully described in copending application Ser. No. 09/373,125, and included here to illustrate the technology state from which this invention departs.

DETAILED DESCRIPTION OF THE INVENTION

Referring now to FIGS. 1A–E, as described more completely in application Ser. No. 09/373,125, each cluster of four processors (Processor0, Processor1, Processor2 and Processor3) has a shared data and input memory stack to which and from which each processor in the cluster can write and read. In this exemplary emulation processor, the memory stack has 256 addressable eight-bit words. Each processor has four read ports for reading an eight-bit word from the data memory comprised of address inputs RA0; RA1; RA2; and RA3 and corresponding inputs to the four eight-to-one multiplexers whose select inputs are TAC0; TAC1; TAC2 and TAC3 respectively. One each clock cycle, the inputs of the eight-to-one multiplexer of each of the four processors receives an eight-bit word from the memory. While generally satisfactory, there are a large number of processors (e.g. 64) and a correspondingly large number of memory stacks on a single ET 4 emulator chip. Silicon real estate is in short supply and the stack memory output ports take up a lot of area on the chip.

Figures 1, 1A:
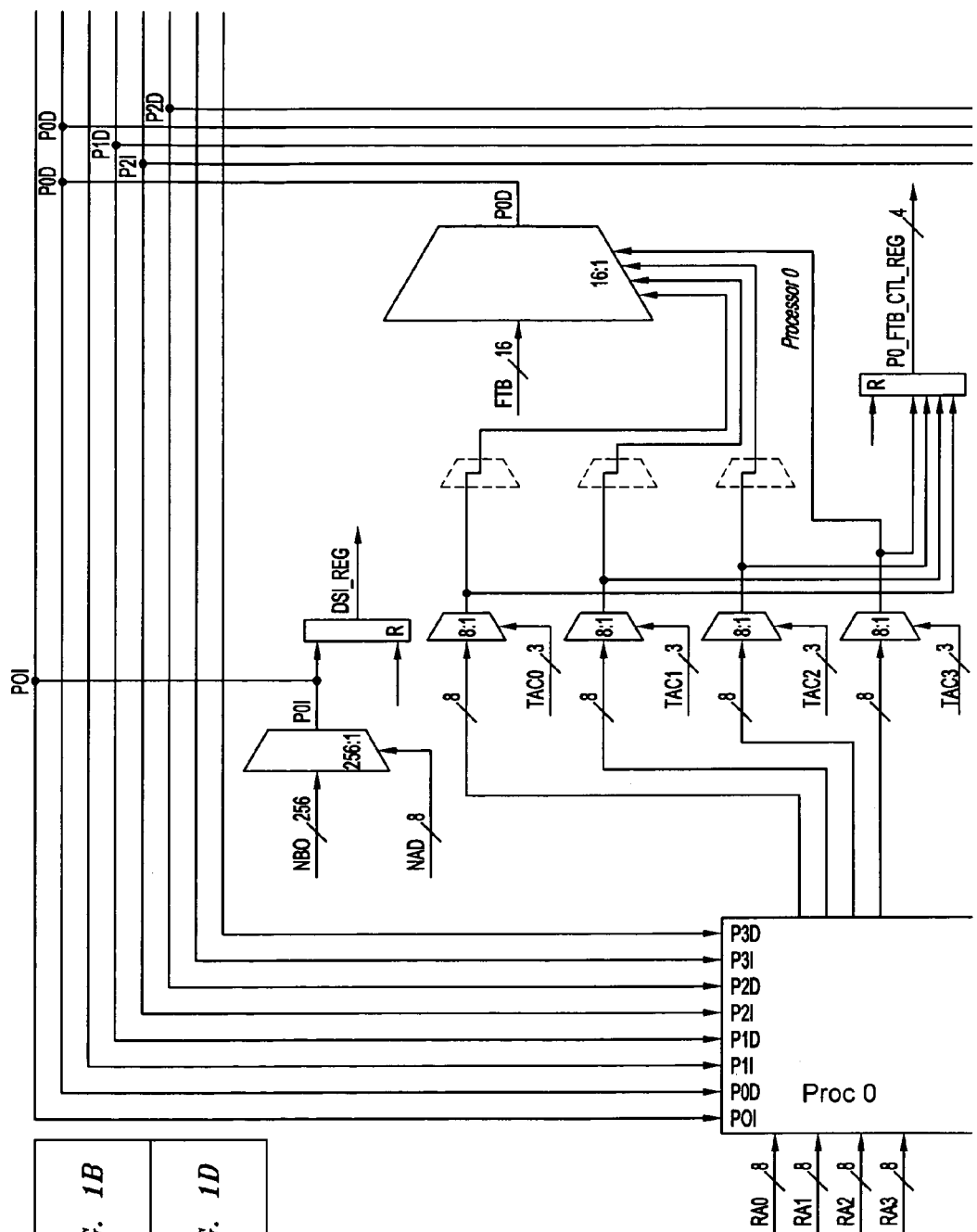
Figure 1B:
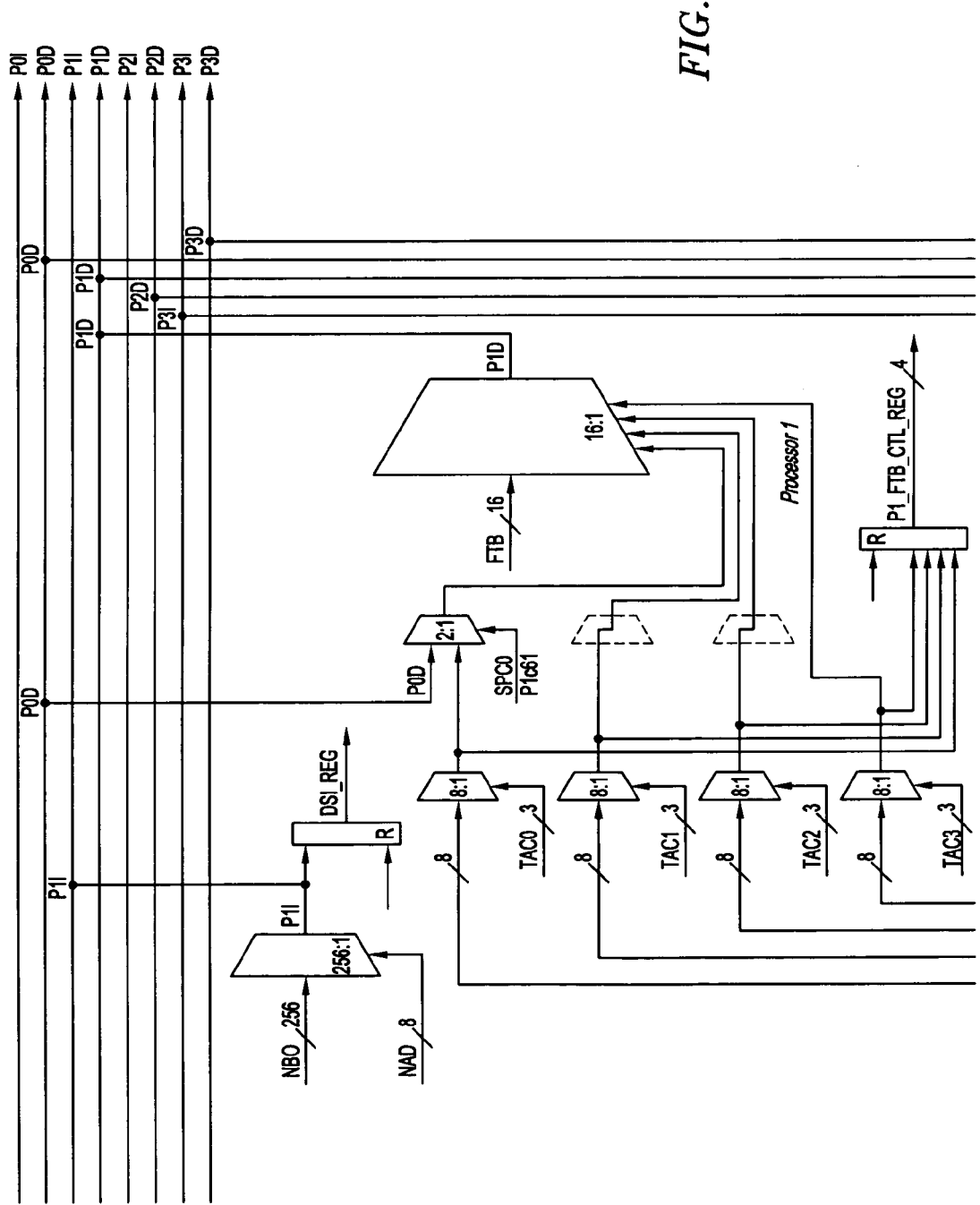
Figure 1C:
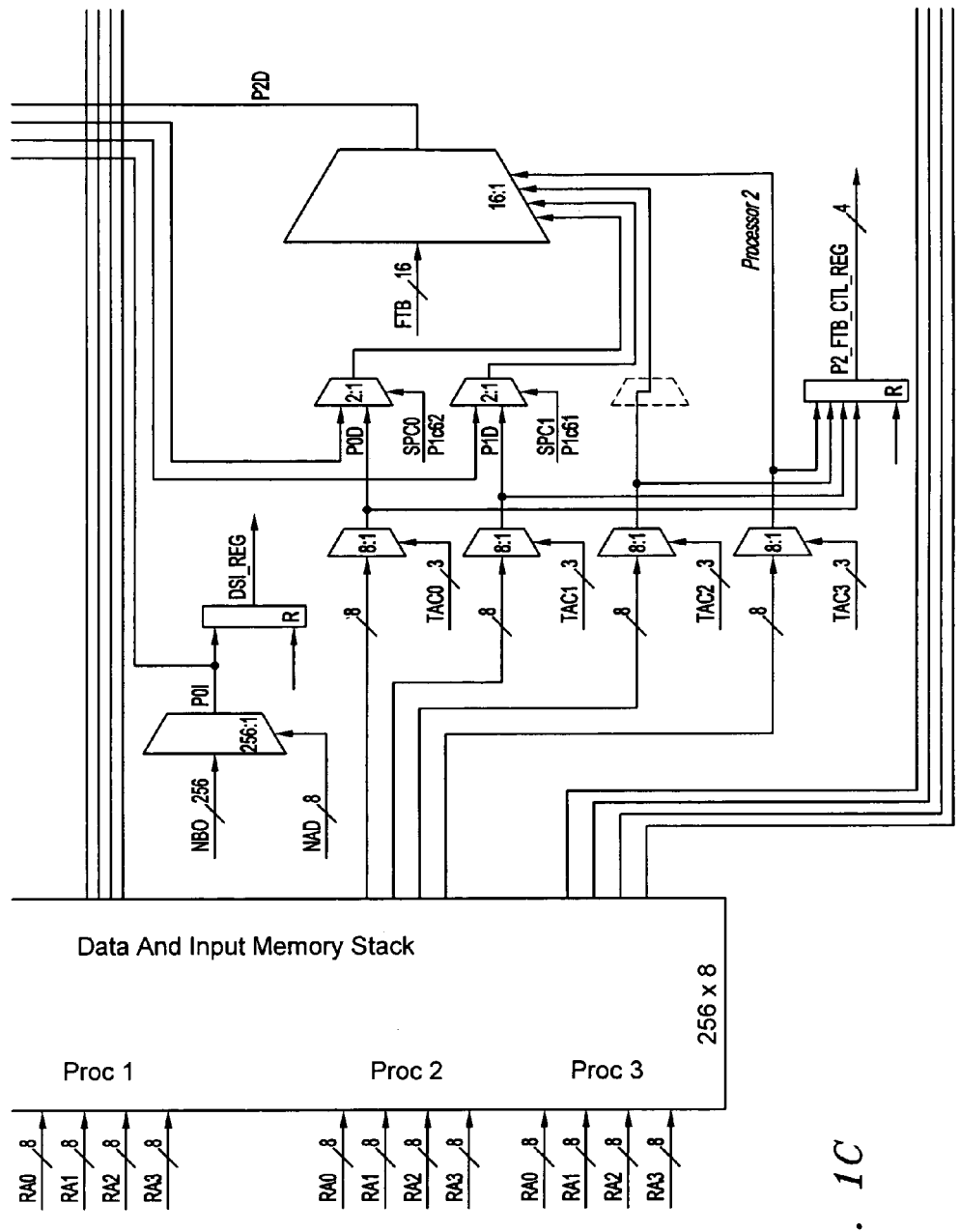
Figure 1D:
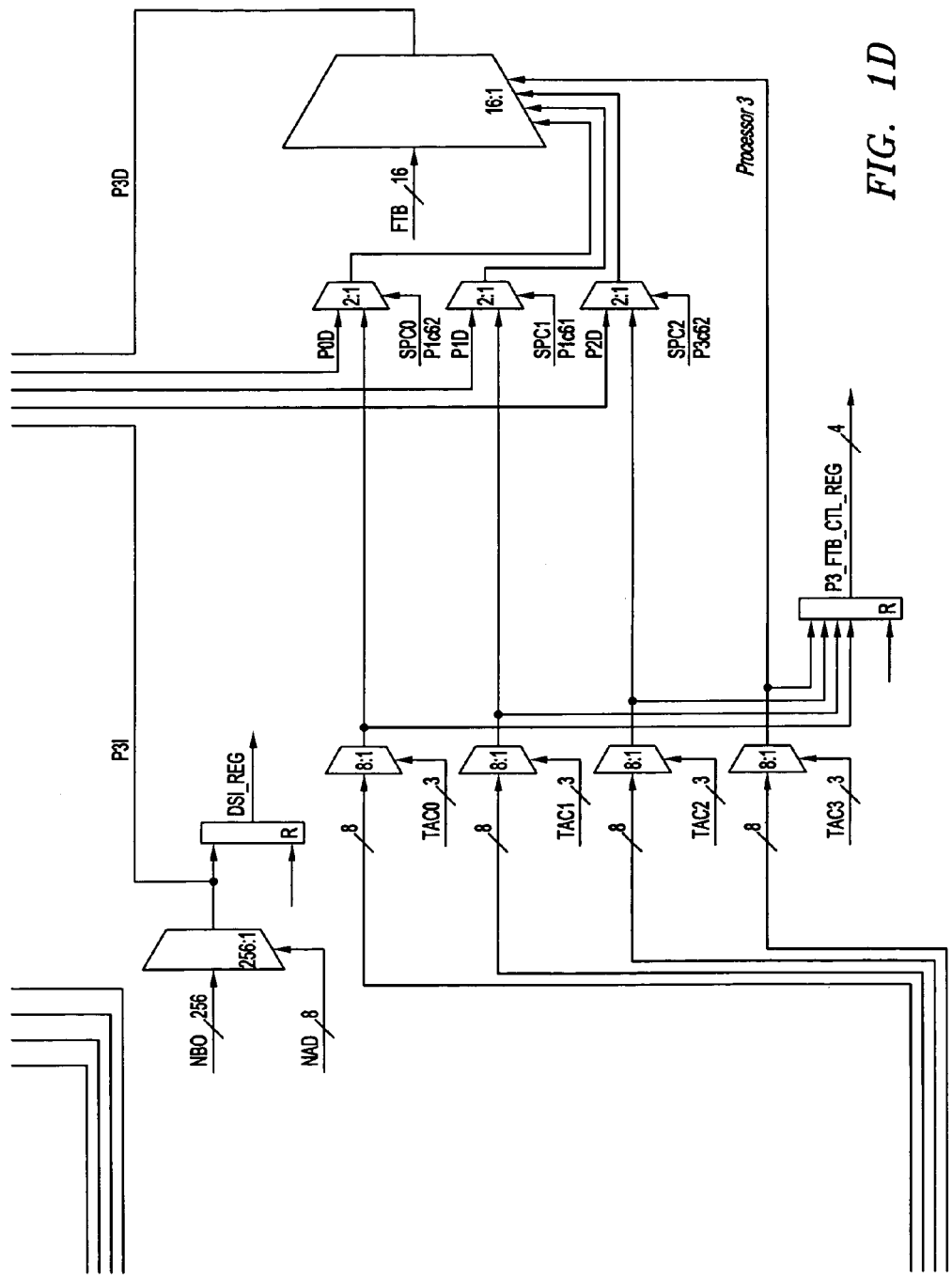
Figure 2:
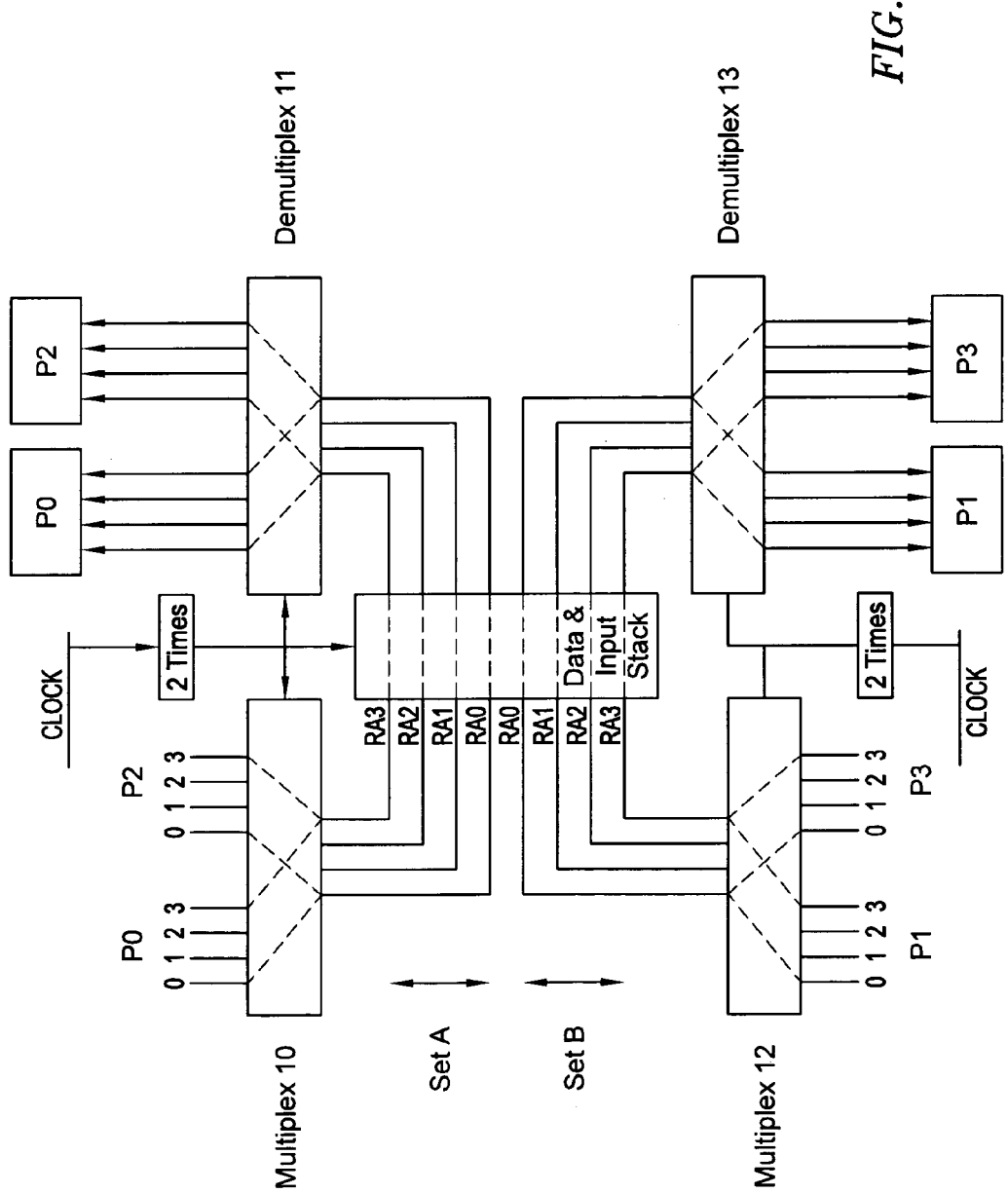
FIG. 2 is a block diagram of the cluster of FIGS. 1A–E (shown in less detail than in FIGS. 1A–E) with multiplexed read port input and data memory in accordance with the teachings of this invention.

Referring now to FIG. 2, in accordance the teachings of the invention, the read ports of the data and input memory stack are time multiplexed and the memory has only sets of two read ports to serve four processors, in this specific embodiment. So that the overall emulation process is not slowed, a memory stack read is carried out at twice the system clock speed. On one memory cycle, multiplexer 10 connects set A read address ports RA0, RA1, RA2 and RA3 to address inputs for processor P0 and the corresponding four outputs as inputs to the four eight-to-one multiplexers of processor P0. Similarly, on this same memory cycle, multiplexer 12 connects set B read address ports to address inputs for processor P1 and the corresponding four outputs as inputs to the four eight-to-one multiplexers of processor P1. On the next clock cycle, multiplexer 10 connects the set A read ports to address inputs for processor P2 and the corresponding four outputs as inputs to the four eight-to-one multiplexers of processor P2. Also multiplexer 12 connects the set B read ports to address inputs for processor P3 and the corresponding four outputs as inputs to the four eight-to-one multiplexers of processor P3.

It will be appreciated that the teachings of this invention can be readily applied where there are eight processors in the cluster. Eight processors in a cluster can be time multiplexed to share four read ports, while the read clock for the memory operates at two times the system clock. If the memory clock is operated at four times the system clock, the memory can be multiplexed so that two ports can serve all eight processors without slowing the emulation process.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A software-driven emulation engine, comprising:
   a plurality of clusters, each of said clusters including:
   a data memory having a set of read ports and an operating clock rate for read operations; and
   a plurality of processors that execute logic gate functions from a logic design, each of said processors having a set of read addresses and accessing said data memory, an operating clock rate of said processors differing from said operating clock rate of said data memory; and
   a time division multiplexer associated with each of said clusters coupling said set of read ports of said data memory to said set of read addresses of one processor of said cluster during one read cycle of said data memory and coupling said set of read ports of said data memory to a set of read addresses of another processor of said cluster during the next read cycle of said data memory,
   wherein said plurality of clusters and said time division multiplexer thereby verify a functionality of the logic design.

2. The software-driven emulation engine of claim 1, wherein said operating clock rate of said data memory is greater than said operating clock rate of said processors.

3. The software-driven emulation engine of claim 2, wherein said operating clock rate of said data memory is at least double said operating clock rate of said processors.

4. A software-driven emulation engine, comprising:
   a plurality of clusters, each including:
   a data memory having first and second sets of read ports and an operating clock rate; and
   a plurality of processors for executing logic gate functions from a logic design, each of said processors of each of said clusters having a set of read addresses and accessing said data memory within each of said clusters, an operating clock rate of said processors differing from said operating clock rate of said data memory; and
   a first time division multiplexer associated with each of said clusters that couples said first set of read ports of said data memory to said set of read addresses of a first processor of said cluster during one read cycle of said data memory and coupling said first set of read ports of said data memory to said set of read addresses of a second processor in said cluster during the next read cycle of said data memory; and
   a second time division multiplexer associated with each of said clusters that couples said second set of read ports of said data memory to said set of read addresses of a third processor of said cluster during said one read cycle of said data memory and coupling said second set of read ports to said set of read addresses of a fourth processor in said cluster during said next read cycle of said data memory,
   wherein said plurality of clusters, said first time division multiplexer, and said second time division multiplexer verify a functionality of the logic design.

5. The software-driven emulation engine of claim 4, wherein said operating clock rate of said data memory is operable during read operations.

6. The software-driven emulation engine of claim 4, wherein said operating clock rate of said data memory is greater than said operating clock rate of said processors.

7. The software-driven emulation engine of claim 6, wherein said operating clock rate of said data memory is at least double said operating clock rate of said processors.

8. An emulation engine, comprising:
   a plurality of clusters, said clusters each comprising:
   a data memory having a set of read ports and an operating clock rate; and
   a plurality of processors for executing logic gate functions from a logic design, each of said processors within each of said clusters accessing said data memory within each of said clusters, an operating clock rate of said processors differing from said operating clock rate of said data memory; and
   a time division multiplexer associated with each of said clusters coupling said set of read ports of said data memory to a set of read addresses of one processor within a first of said clusters during one read cycle of said data memory and coupling said set of read ports of said data memory to a set of read addresses of another processor within said first of said clusters during the next read cycle of said data memory,
   wherein said plurality of clusters and said time division multiplexer verify a functionality of the logic design.

9. The emulation engine of claim 8, wherein said operating clock rate of said data memory is operable during read operations.

10. The emulation engine of claim 8, wherein said operating clock rate of said data memory is greater than said operating clock rate of said processors.

11. The emulation engine of claim 10, wherein said operating clock rate of said data memory is at least double said operating clock rate of said processors.

* * * * *